United States Patent [19]

Girvin

[11] Patent Number: 5,217,241
[45] Date of Patent: Jun. 8, 1993

[54] BICYCLE SUSPENSION SYSTEM

[75] Inventor: Robert H. Girvin, Holliston, Mass.

[73] Assignee: Ocean State International Inc., Woonsocket, R.I.

[21] Appl. No.: 584,090

[22] Filed: Sep. 18, 1990

[51] Int. Cl.$^5$ .................................. B62K 3/00
[52] U.S. Cl. ............................ 280/284; 280/288; 180/227; 267/294
[58] Field of Search .......... 280/284, 283, 286, 281.1, 280/288, 285, 275, 276, 274; 180/227; 267/294, 141.1, 292, 141, 153

[56] References Cited

U.S. PATENT DOCUMENTS

| | | | |
|---|---|---|---|
| 2,283,671 | 5/1942 | Finlay et al. | 280/284 |
| 2,446,731 | 8/1948 | Wheler | 280/284 |
| 3,083,039 | 3/1963 | Moulton | 280/277 |
| 3,133,748 | 5/1964 | Gunnerson | 280/284 |
| 3,151,878 | 10/1964 | Uncles | 280/284 |
| 3,263,985 | 8/1964 | Planta | 267/153 |
| 3,376,031 | 4/1968 | Lee | 267/292 |
| 3,817,342 | 6/1974 | Hamilton | 180/227 |
| 3,865,402 | 2/1975 | Zenser | 280/276 |
| 3,931,990 | 1/1976 | Knapp | 280/283 |
| 3,942,821 | 3/1976 | Bock | 280/277 |
| 3,982,770 | 9/1976 | Satoh et al. | 280/284 |
| 4,046,396 | 9/1977 | Taylor et al. | 280/281.1 |
| 4,170,369 | 10/1979 | Strutman | 280/261 |
| 4,327,930 | 5/1982 | Tominaga et al. | 280/284 |
| 4,421,337 | 12/1983 | Pratt | 280/277 |
| 4,576,939 | 3/1986 | Moulton et al. | 280/276 |
| 4,582,343 | 4/1986 | Waugh | 280/284 |
| 4,679,811 | 7/1987 | Shuler | 280/284 |
| 4,732,404 | 3/1988 | Coetzee | 280/283 |
| 4,787,648 | 11/1988 | Coetzee | 280/275 |
| 4,789,174 | 12/1988 | Lawwill | 280/284 |
| 4,997,197 | 3/1991 | Shultz | 280/275 |
| 5,098,114 | 3/1992 | Jones | 280/284 |

FOREIGN PATENT DOCUMENTS

| | | | |
|---|---|---|---|
| 0057973 | 11/1912 | Fed. Rep. of Germany | 280/284 |
| 0171483 | 6/1952 | Fed. Rep. of Germany | 280/283 |
| 0907380 | 1/1954 | Fed. Rep. of Germany | 280/284 |
| 0921180 | 4/1947 | France | 280/283 |
| 0986467 | 4/1951 | France | 280/284 |
| 1037947 | of 1953 | France | 180/227 |
| 0369742 | 3/1939 | Italy . | |
| 0009254 | of 1887 | United Kingdom . | |
| 0029850 | of 1910 | United Kingdom | 280/276 |
| 0194012 | 3/1923 | United Kingdom | 280/283 |
| 1205286 | 9/1970 | United Kingdom | 280/284 |
| 2089466 | 6/1982 | United Kingdom | 267/294 |

Primary Examiner—Margaret A. Focarino
Assistant Examiner—Paul Dickson
Attorney, Agent, or Firm—Wolf, Greenfield & Sacks

[57] ABSTRACT

The invention provides a suspension system for a bicycle. The suspension system utilizes novel shock absorbers which contain elastomeric elements which are restricted against radial expansion by retention washers. A rear wheel suspension system has a chain stay and a seat stay joined at one end and free at the opposite end. The free end of the chain stay is pivotably attached to the mainframe at a location close to, and preferably above, the largest diameter sprocket of the crank assembly. The linear shock absorbers of the invention are positioned such that they displace along an axis aligned tangentially with a circle having its center at the pivot.

29 Claims, 6 Drawing Sheets $P_{F_1} > P_{F_2} > P_{F_3} \to 0$

BICYCLE SUSPENSION SYSTEM

This invention relates to bicycle suspension systems.

BACKGROUND OF THE INVENTION

Bicycles have long been used as a means for transportation and recreation. Typical prior art bicycles have relatively rigid frames, which transmit shocks resulting from potholes, rocks or other unevenness in the riding surface directly to the rider. This results in discomfort, as well as a loss of energy. This is particularly true of bicycles known as mountain bikes which are designed to be ridden over rugged terrain.

Attempts to solve these problems have included adding suspension systems to bicycles. While various interesting and innovative approaches have been attempted, all have serious drawbacks. Included among the drawbacks are an inability to provide shock absorbance capable of providing both a soft response on small bumps and a strong one on big bumps. Another drawback is the significant amount of rider-energy absorbed into the suspension system which otherwise would provide forward movement.

SUMMARY OF THE INVENTION

These and other drawbacks are overcome by the present invention which provides a bicycle suspension system which is capable of transforming substantially all of the pedal force into forward motive force when in high gears, while providing increased traction in the lower gears. The suspension system of the invention has enhanced traction, reduced "bobbing", and improved bicycle performance by reducing bump resistance. The suspension system also is designed to keep weight at a minimum, to avoid complex or expensive parts, and to provide relatively simple maintenance.

According to one aspect of the invention, a bicycle frame is provided. The frame includes a main frame with a seat tube and a down tube interconnected to form a main frame junction. A crank assembly is attached to the main frame and has a large diameter sprocket. A pivotable rear wheel suspension system is attached to the main frame. The suspension system includes a chain stay and a seat stay, each stay having a jointed end and a free end. The jointed ends are interconnected to form a nonpivoted joint, while the free ends are interconnected with the main frame. The free end of the chain stay is pivotably attached to the main frame at a location above the main frame junction and close to, and preferably immediately above, the large diameter sprocket of the crank assembly. When the chain is on the large diameter sprocket, the pivot point of the chain stay is at or immediately above the chain line. The interaction of chain forces with spring forces is minimal and bobbing is minimal. When the chain is moved to smaller sprockets, the chain line is below the pivot point and a more significant moment is created which will load the rear wheel and increase traction.

Preferably the main frame is provided with a bridge tube interconnecting the seat tube and the down tube, with the chain stay pivotably attached to this bridge tube. It is likewise preferable to have the crank assembly attached to the main frame at the main frame junction. These features strengthen the overall interconnection of the various parts. In one particularly preferred embodiment, the free end of the chain stay is configured in the shape of an arc whereby the derailleur may be positioned conventionally upon the seat tube, and at the same time allowing the pivot to be located close to the largest diameter sprocket of the crank assembly.

According to another aspect of the invention, the free end of the seat stay is attached to the main frame via a linear shock absorber, which shock absorber is positioned such that it displaces along an axis aligned tangentially with a circle having its center at the pivot. Preferably, the jointed ends of the seat stay and chain stay are interconnected to form a nonpivoted joint which is attached to a rear wheel at an axle bracket. Most preferably, the seat stay and chain stay are interconnected only proximate to the axle bracket and are unconnected to one another along their lengths extending from the nonpivoted joint to provide a unitary resilient fork capable of flexure.

According to another aspect of the invention, a bicycle frame having a wheel suspension shock absorber is provided. In one embodiment, the shock absorber has an elastomeric element and retention washers for limiting radial expansion of the elastomeric element. Most preferably the retention washers are configured for progressively limiting the spring rate of the elastomeric element. In another embodiment, the shock absorber includes at least two elastomeric elements in axial alignment and separated from one another by a rigid element. Most preferably the elastomeric elements are slidably positioned on a rod in an interfering fit whereby a frictional force resisting movement of the elastomeric elements on the rod is generated.

DETAILED DESCRIPTION OF A PREFERRED EMBODIMENT

Figure 1:
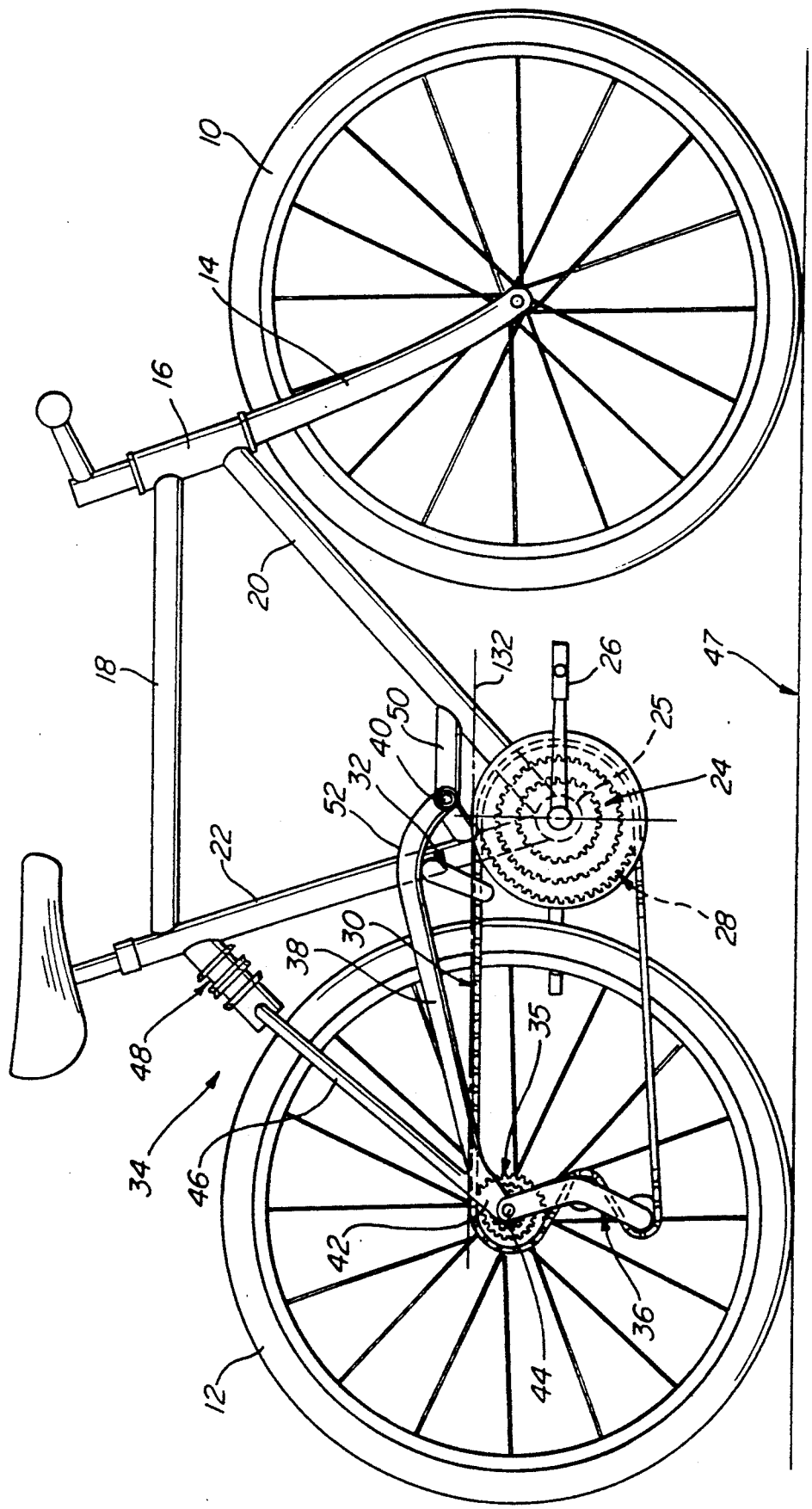
FIG. 1 is a side view of a bicycle including a frame with a rear suspension system according to the invention.

A bicycle with a frame having a rear suspension according to this invention is depicted in FIG. 1. The frame is generally constructed from tubular members of a suitably strong material such as steel or aluminum alloy. The bicycle frame of this particular example is constructed of entirely 4130 low steel alloy tubes. It displays a traditional configuration having large equal diameter front and rear wheels 10 and 12, a front fork assembly 14 that carries the front wheel 10 and pivots in a head tube 16 to steer the bicycle, a top tube 18 and down tube 20 connected between the head tube and opposing ends of a seat tube 22 that is disposed substantially vertically. Proximate to the connection of the down tube and seat tube is positioned a crank bracket 25, through which extends a crank assembly 24 having pedals 26 and a number of concentric spaced sprockets 28 of varying diameters. There are three sprockets and the chain 30 shifts between each of them by means of a front derailleur 32 attached to the seat tube 22.

The rear wheel 12 is supported dynamically relative to the rest of the frame (the "main frame" herein which includes the top, down seat and head tubes) by a suspension system 34 according to this invention. The system may be constructed to allow the use of a standard size wheel, rear chain sprockets 35 and rear derailleur 36. Between ½ and 2 inches of approximately vertical displacement of the wheel 12 relative to the frame is contemplated under normal usage. The suspension is also specifically designed to support a 180 lb. man through at least a four foot drop without permanently damaging the system.

The system 34 particularly comprises a pair of approximately 1.2 millimeter wall thickness tubular chain stays 38, disposed upon either side of the rear wheel 12. The chain stays 38 carry a pivot 40 at an end closest to the seat tube 22 and each taper from an outer diameter approximately 1⅛" at the pivot 40 to an opposite end that is approximately ⅞" in diameter and carries an axle bracket 42 to support the rear wheel's axle 44. A seat stay 46 with a wall thickness of 0.8-1.0 millimeters also connects to each axle bracket 42 and rises to a fixed connection on a displaceable spring assembly 48 secured to the upper portion of the seat tube 22. The tube has a uniform outer diameter of approximately ⅝". As will be described further below, the positioning of the chain stay pivot 40 is significant, and to facilitate its location, a bridge tube 50 (see also FIG. 6) extends between the down tube and the seat tube at a location above the level of the largest diameter sprocket of the crank assembly 24.

The chain stays 38 on either side of the wheel 12 provide clearance around both the front derailleur 32 and the chain 30 since they are curved at a point 52 rising upwardly from the pivot 40 to this point 52 and then declining to the level of the axle bracket 42. Thus, the curved part 52 of the chain stay remains, throughout its pivoting travel, clear of the chain and shifting mechanism. A clearance is additionally provided by spacing each of the chain stays 38 apart relative to the other at the pivot 40 (See also the top view at FIG. 5). Note that the spacing of the chain stays 38 also provides a substantial increase in transverse support over a system in which the stays converge a their pivot. This particular advantage is discussed further below.

Figure 2:
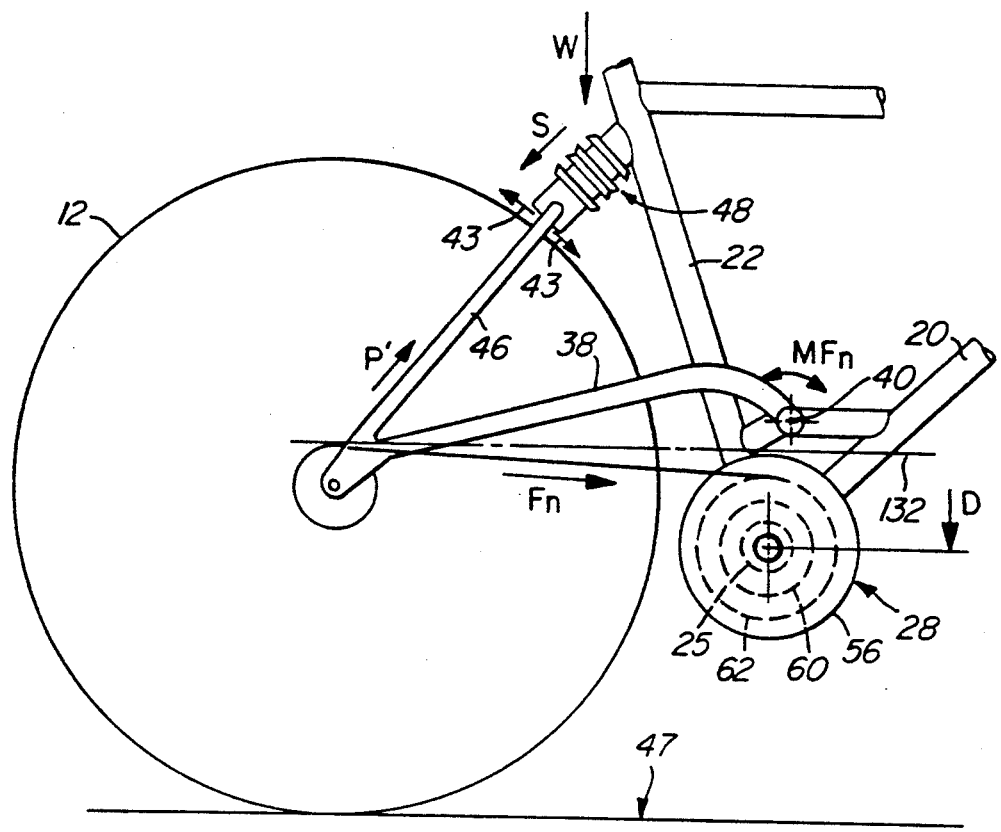
FIG. 2 is a partial view of the rear suspension system of FIG. 1 including force factors.

As the bicycle frame experiences a load while the rear wheel 12 remains fixed against the ground, the chain stays 38 are urged to rotate upwardly about the pivot 40. The load force and resulting displacement are, therefore, transferred directly from the rear axle 44 through the seat stays 46 to the spring assembly 48. FIG. 2 particularly depicts the relationship of forces acting upon the suspension system. The weight W of a rider (a load) translates into a spring force S acting at the spring assembly 48 that is countered by a supporting force P' transferred through the seat stays 46 from the rear wheel fixed against the ground 47. The balance of the spring force S versus the supporting force P' results in some compression of the spring as a rider places normal resting weight W upon the bicycle. Thus, the height of the bicycle relative to the ground decreases to a new equilibrium "riding height".

Additional spring compression beyond a riding height occurs when a sudden impulse, such as that derived from a bump, is applied to the suspension as the bicycle moves at a given velocity. The spring assembly 48 deforms, thereby, absorbing the impulse energy transferred to the rear wheel 12 from impacting a bump. In the absence of the spring assembly 48, this force would be transferred directly to the frame and rider resulting in a rough ride and a tendency for the bicycle to bounce over bumps, with the impulse acting upon the full mass of the frame and rider rather than primarily upon the suspension stays and spring. However, the relatively low mass of the pivotably attached suspension components allows localized rapid absorption of the impulse while the rest of the higher mass frame and rider remain relatively level with respect to the bump. Thus, the bicycle hugs the ground more effectively and maintains greater traction with the rear wheel rapidly conforming the bumps.

In addition to the foregoing advantages, the suspension system of the invention also utilizes favorably an additional group of forces, the pedal and chain forces, D and $F_n$ respectively. Referring to FIG. 2, the pedal force D tends to act downwardly at a maximum as the rider rotates the pedals to a position halfway between the highest and lowest points of the rotation relative to the ground, as shown. Conversely, the pedal force D is minimum at the highest and lowest points of rotation. Thus, a cyclic loading of the bicycle occurs as a rider pedals. The invention takes advantage of this cyclic loading and at the same time reduces the undesireable effects of cyclic loading characteristic of prior art suspension systems.

The positioning of the pivot 40 relative to the chain line 132 determines whether the pedal force D and resulting chain force $F_n$ will act to generate a moment $MF_n$ about the chain stay pivot 40 that serves to compress the spring assembly (thereby tending to raise the rear wheel off the ground) or expand the spring assembly (thereby tending to drive the rear wheel toward the ground). When the pivot is positioned at the chain line 132, the system is essentially neutral, that is, there is no (or little) tendency for the rear wheel to be raised off or be driven toward the ground. If the pivot is located above the chain line, then the rear wheel tends to be driven toward the ground with pedal loading; if it is located below the chain line, then the rear wheel tends to be raised away from the ground with pedal loading.

The suspension system of the invention is designed to maximize the potential advantages of these forces and minimize the disadvantages. According to the invention, the pivot is positioned at or immediately above the chain line 132 defined when the chain is positioned on the largest diameter sprocket 56. Thus, when pedaling in high gear, such as when pedaling at high speed, there either is no upward or downward force exerted on the rear wheel (pivot at the chain line) or there is a relatively small downward force exerted on the rear wheel (pivot immediately above the chain line). The disadvantage of wasting pedaling energy by transferring it to the suspension system is minimized under these circumstances. The pivot 40 may be positioned as much as 3 inches above the chain line, but preferably is positioned less than 2 inches and most preferably is positioned about one inch above the chain line. When pedaling using lower gears (gears 60, 62), such as for example when climbing a hill, the pivot is located sufficiently above the chain line such that the rear wheel is driven downwardly upon pedal loading. This is particularly desireable when pedaling in low gear in rough terrain because it provides added traction.

Because there are three chain lines or typical bicycle gear arrangements, a moment $MF_n$ cannot be avoided. However the suspension system of the invention places the pivot in a position to take advantage of such forces.

Figure 3:
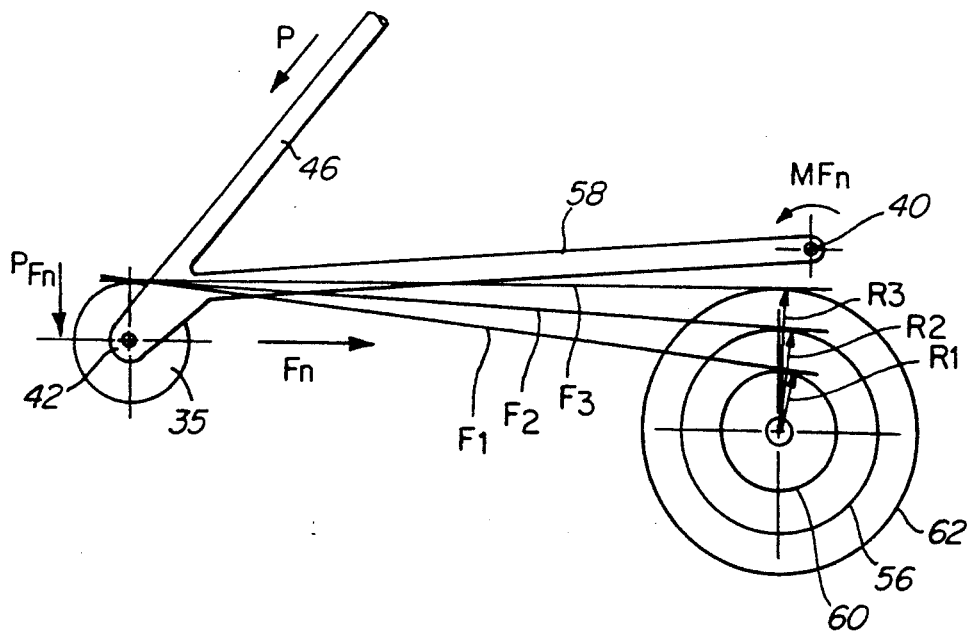
FIG. 3 is a schematic illustration of the moments acting on the suspension system when the chain is positioned on various sprockets of the crank assembly.

Referring now to FIG. 3, a force distribution in the suspension system resulting from application of the chain force $F_n$ is shown (see also FIG. 2). In the largest diameter sprocket 56, having a radius $R_3$, the chain force $F_3$ is most closely aligned along the chain stay member 58, shown schematically as a straight beam. Therefore, the chain force $F_3$ generated by the pedals is absorbed largely by pure compression along the length of the chain stay member 58 (the angle between the chain 30 and chain stay member 58 being extremely acute). This results in a very small generated moment $MF_n$ about the pivot 40. However, in the lowest (granny) gear, when the chain rides on the smallest diameter sprocket 60, having a radius $R_1$, a significant moment $MF_1$ is generated by the chain force $F_1$. This moment causes a downward force $PF_1$ to act at the wheel axle 44. $PF_n$, consequently, translates into a downward force vector P upon the seat stay 46. $PF_n$, therefore, releases compressive pressure on the spring assembly 48. As such, the oppositely acting force vector P generated by chain force causes the wheel to pull away from the spring at the same instant the highest pedal force D causes the spring to compress. The resulting opposition of forces significantly reduces the inch worming effect by cyclically counteracting a cyclically loaded pedal force D. Of course, the intermediate sprocket 62 having a radius of $R_2$ generates an intermediate pedal force $F_2$ resulting in an intermediate moment $MF_2$ and downward force $PF_2$. The generation of chain force moment $MF_n$, thus provides an effective down force to the rear wheel 12 when it is most needed, that is, when traveling over rocky terrain and up steep grades in the lowest gears.

Figure 4:
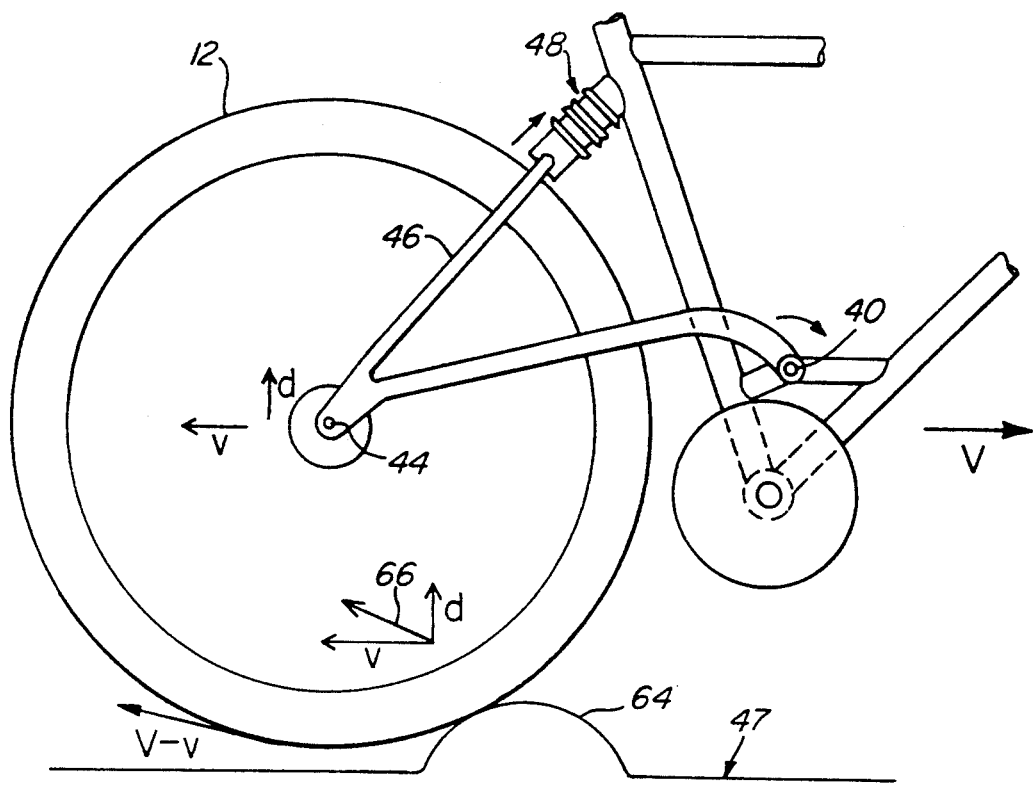
FIG. 4 schematically illustrates the action of the rear suspension system when it encounters a bump.

Aside from the significant advantages derived by limiting inch-worming, the pivot 40 positioning also facilitates greater maneuvering control and traction while traversing irregular surfaces. FIG. 4 illustrates the displacement of the rear wheel 12 when encountering a bump 64 as the bicycle travels at a velocity V. Striking the bump 64 at a velocity V imparts a reactive force in the direction of the angled force vector 66. Since the pivot 40 is located above the level of the rear axle 44 relative to the ground, encountering a bump 64, or other steep surface imperfection, which normally causes the wheel to pivot upwardly as shown by the vector d, also causes the wheel to extend rearwardly at a velocity of v. Prior to encountering the bump 64 both the front and rear bicycle wheels 10, 12 move with a tangential velocity V equal to that of the bicycle frame. However, since the rear wheel 12, subsequent to striking the bump 64, moves rearwardly with a velocity of v the total tangential velocity of the rear wheel after encountering the bump is V−v, which is of course less than V. As such, the wheel 12 slows down slightly when encountering the bump 64 facilitating maintenance of control and traction. Similarly, the wheel 12 should speed up slightly during recovery from the bump 64 since the suspension system returns to a less compressed state pivoting the wheel forwardly relative to the direction of motion. The creation of this desirable effect depends specifically upon the placement of the pivot 40 above the level of the rear axle 44.

The use of a bridge tube 50 particularly allows the positioning of the pivot 40 above the level of the rear axle 44 as well as above the largest chain sprocket 56. The bridge tube 50 is highly stressed, carrying the load supported by the rear wheel, so it is constructed, in this example, of approximately 1¼" outer diameter tubing with a wall thickness of approximately 1.5 millimeters. The fact that the bridge tube spans the seat and down tubes allows the rear wheel load to be distributed between these frame members. The bridge tube 50 also adds strength to the overall frame rather than subtracting it since it acts as an angle brace at the joint of the seat tube 22, the down tube 20 and the crank bracket 25. It is preferable to locate the crank bracket 25 at the joint between the seat tube and down tube. This joint is a desireable location for receiving the very high loads generated from pedaling and chain forces. As a result of such positioning, lighter and stronger frame arrangements are possible.

Figure 5:
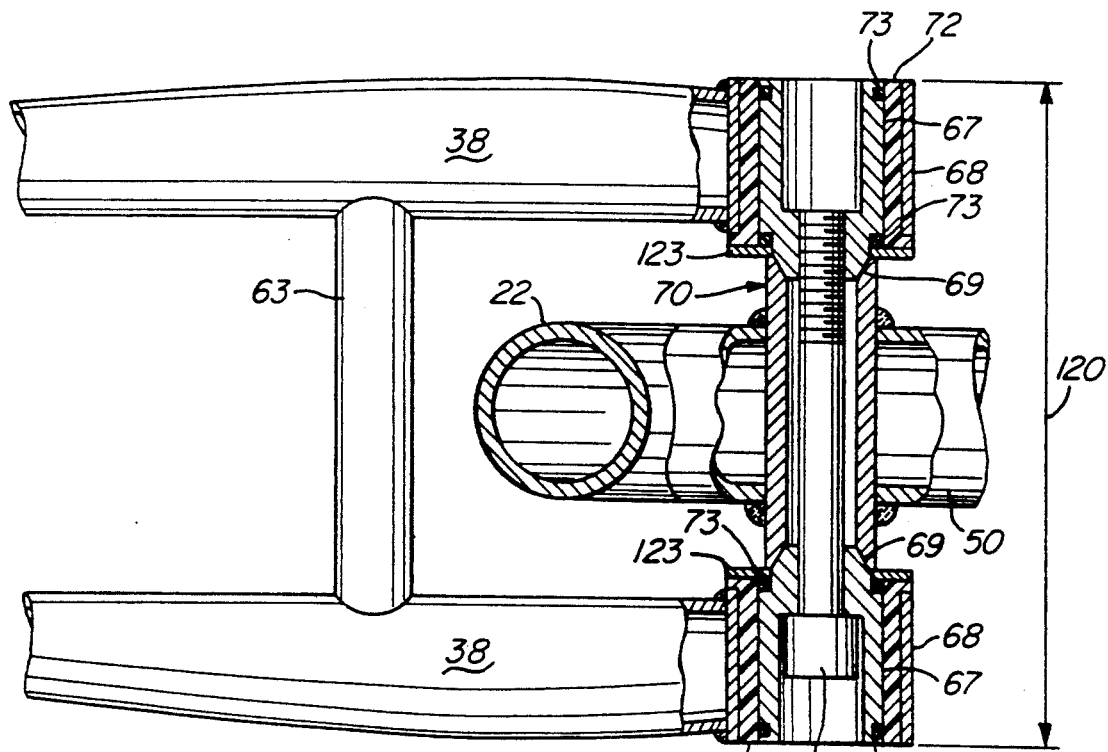
FIG. 5 is a partial cross sectional view of the chain stays and pivot assembly.
Figure 6:
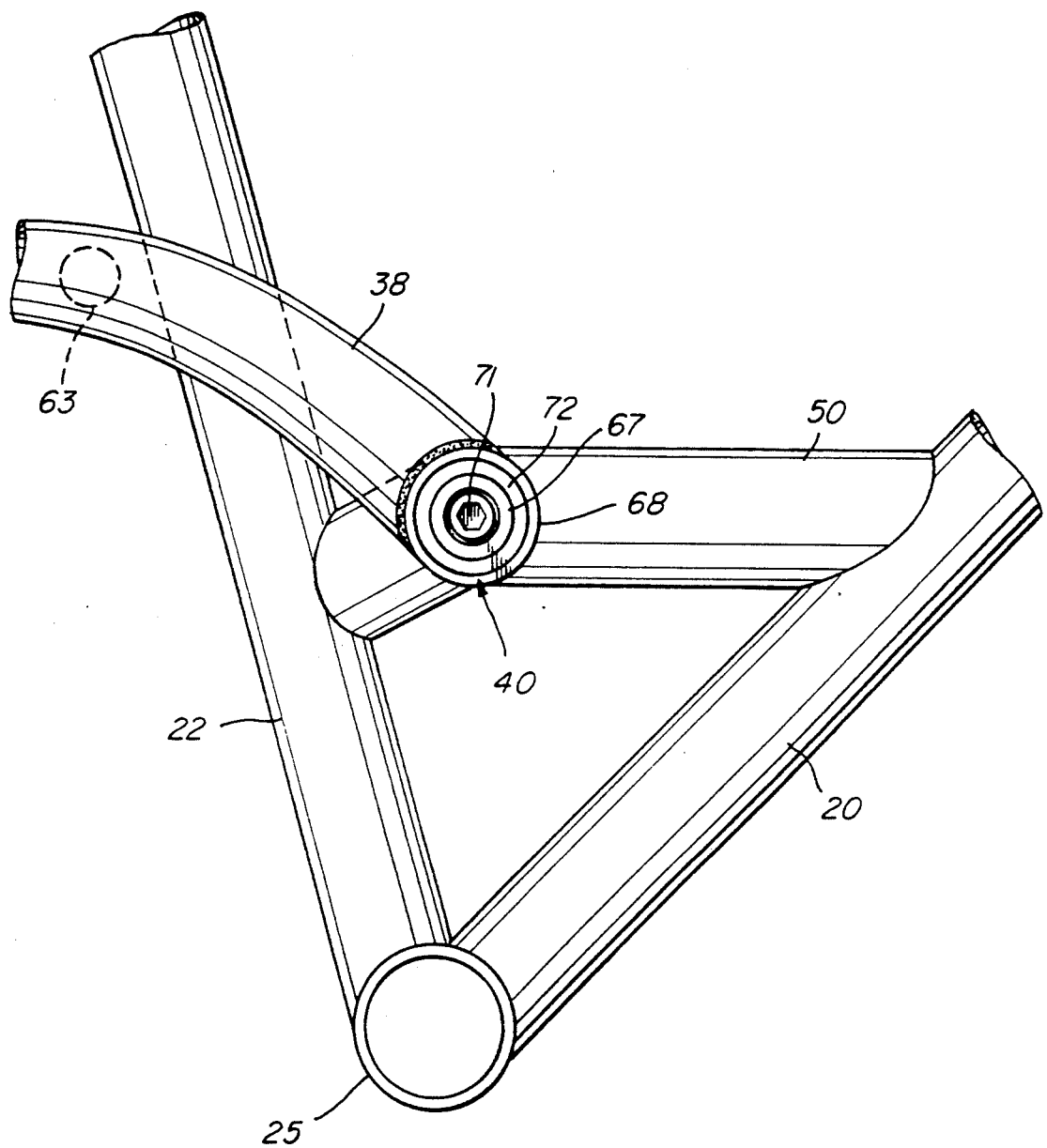
FIG. 6 is a partial side view of the lower portion of the main frame.

Referring to FIGS. 5 and 6 the chain stay spacing (approximately 50 millimeters of inner spacing) allows them to clear the seat tube 22 and front derailleur 32 at all times during suspension displacement. The wider the spacing of the stays, the better transverse support achieved, thus, the outer spacing 120 of the chain stays is just enough to allow the pedals 26 to clear during rotation, the pedals being outward of the stays 38. This outer spacing distance in this example is approximately 107 millimeters. Each chain stay 38 includes a thin walled (approximately 1.5 millimeter) arm end 68 force fitted onto a bearing sleeve 72 that is sized to fit rotatably upon an axle 67. The axle is constructed of 2014 aluminum alloy in this example and one is mounted on each end 69 of a bearing support tube 70. The tube 70 is mounted through the bridge tube. The support tube 70 is constructed of approximately 19 millimeter outer diameter tube with an inner diameter of approximately 13 millimeters. This provides ample clearance for a bolt 71 that is tightly torqued to firmly join each of the axles 67 to the ends 69 of the support tube. Note that the interconnection of the axles 67 and the support tube ends 69 is conical in shape. This allows extremely tight and positive positioning of the axles onto the tube 70 and increases transverse strength of the connection. The bearings 72 themselves may be constructed of a suitable material such as Delrin. The bearings 72 have an inner diameter of approximately 21 millimeters and closely, but rotatably, mate with the axle 67 outer walls. The arm ends 68 are composed of the same tubular material as the rest of the frame and are welded to the chain stays 38 in this example. An aluminum washer 123 is sandwiched each bearing sleeve 72 and tube end 69 to provide a full backing for the larger diameter bearing sleeve 72. Note that the bearings 72 are sealed against dust entry by means of conventional sealing rings 73 located upon both ends of the bearing. The connection of the bearing support 70 to the bridge tube 50 may be accomplished by welding about the perimeter of the connection, or by other suitable means.

The chain stays 38 remain fixed on their respective axles 67 by means of a connecting tube 63 (¾ outer diameter in this example) welded between the chain stays just rearward of the seat tube. This is illustrated in FIGS. 5 and 6.

This particular pivot arrangement allows firm, sturdy mounting of the chain stays 38 relative to the frame with enhanced transverse support. Rotation of the chain stay and support assembly about the frame longitudinal axis 75 is therefore, minimized.

The spring assembly 48 of FIGS. 1 and 2 is a linearly displaceable shock absorber mounted with one end fixed to the seat tube 22 and the other fixed to the seat stays 46. It stands just high enough upon the tube 22 to provide clearance for the rear wheel 12. The spring assembly 48 is aligned along a direction tangent to a circle having its center at the pivot 40. Tangential alignment obviates the need for additional pivots between the spring assembly, the seat tube 22 and each seat stay 46. Use of no pivots substantially increases transverse support and frame strength in the suspension system of this example. In absence of tangential alignment, such a pivot arrangement would be necessary since the displacement of a spring not closely aligned with the direction of seat stay 46 displacement results in misalignment of components. This significantly increases spring wear. However, in the preferred tangential arrangement, the seat stays 46 may be firmly and permanently connected to the spring assembly 48 with virtually all force transferred through the stays 46 in a direction that is directly aligned with the assembly 48. Since each pair of seat stays 46 and chain stays 38 are joined only at their respective axle bracket 42 and since the seat stays are flexible, any slight misalignment of the seat stays 46 (as a result of their small arcuate path 43, as shown in FIG. 2, when displacing) that may occur during pivoting of the suspension system is accomodated by flexion of the stays 46 along their lengths. Note that the chain stays 38 are substantially thicker than the seat stays and thus, their flexion is minimized. Joining the chain and seat stays together at any point along their length other than axle brackets 42 would reduce this desirable chain stay flexion.

Figure 7:
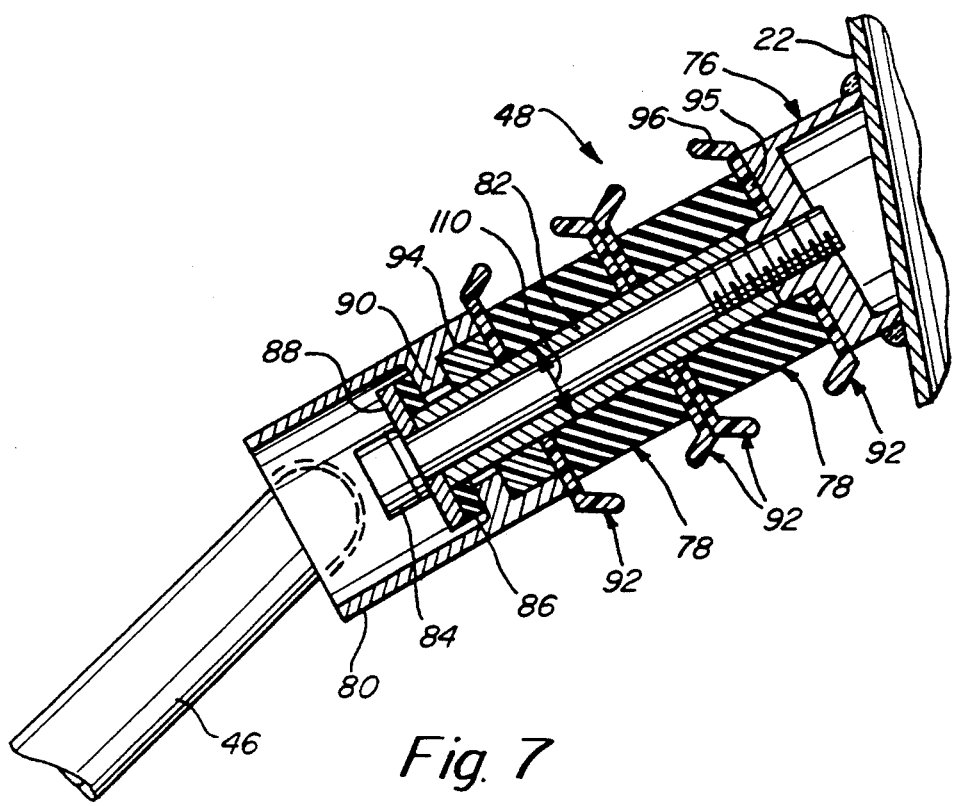
FIG. 7 is a cross sectional view of a linear shock absorber according to the invention.

The load carried by the suspension system is transferred primarily through each of the two seat stays 46 into the spring assembly 48 as detailed in FIG. 7. Since the chain stays themselves bend very little elastically to absorb the force of impact, the spring 48 is primarily responsible for absorption of loads and impacts. An effective spring design is therefore critical.

A spring could be constructed with mechanical, hydraulic or pneumatic components in this suspension, but the elastomeric material used in the embodiment of FIG. 7 provides for an inexpensive and highly durable spring system. The elastomer also provides sufficient damping to guarantee a smooth ride without undue oscillation or violent jolting when the bicycle travels over irregular surfaces. Urethane in particular provides the desired spring and dampening characteristics for a spring according to this invention.

The assembly 48 particularly includes a spring mount 76 attached permanently to the seat tube 22 by, for example, welding. The spring mount provides one of the bases for a pair of urethane springs 78 that have an opposing base at a tubular spring guide 80. The spring guide 80 is attached firmly to the ends of the seat stays 46, also by welding in this example. The springs 78 ride upon a guide tube 82 that is secured by a through-mounted bolt 84 to the spring mount 76. The end of the bolt 84 opposite the mount 76 includes a rebound, urethane washer 86, that also may be constructed from a conventional O-ring, backed against a metallic stop washer 88. The rebound washer 86 engages a shoulder 90 disposed about the inner perimeter of the spring guide 80. Thus, the springs 78 are prevented from expanding beyond a predetermined distance due to the stoppage of the shoulders 90 engaging the rebound washer 86. This absorbs and dissipates the energy stored within the spring whenever the spring is allowed to return to its unloaded state.

Figure 11:
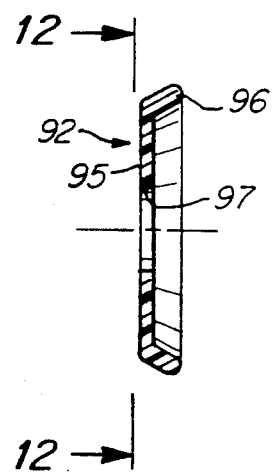
FIG. 11 is a cross sectional view of a retention washer of FIG. 7.
Figure 12:
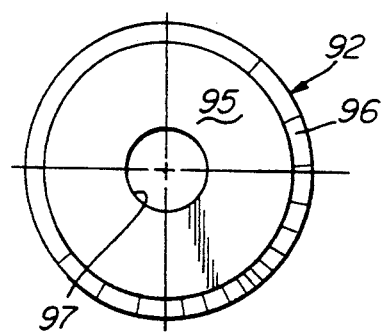
FIG. 12 is a front view of the retention washer of FIG. 11 line 12—12.
Figure 13:
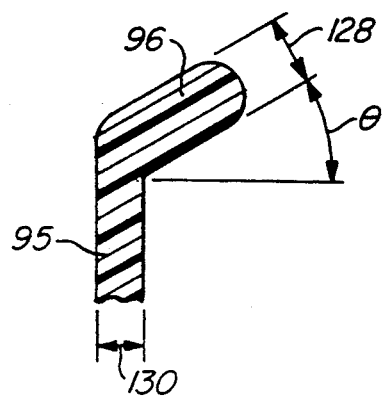
FIG. 13 is an enlarged, partial cross-sectional view of the perimeter of the retention washer of FIG. 11.

Between each urethane spring 78 stands a pair of inwardly disposed retention washers 92 constructed in this example of ABS plastic. The retention washers 92 (See FIGS. 11 and 12) are saucer shaped, each having a flat disc like base 95 and a round tapered rim 96 extending radially outwardly (frustaconically) from the base 95. They include a central hole 97 approximately 13.1 millimeters in diameter allowing a firm but slidable fit over the guide tube 82. The base 95 is approximately 1.8 millimeters 130 thick and the rim is thicker for strength, having a thickness 128 of 2.3 millimeters (See FIG. 13). The retention washers 92 closest to each of the spring guide 80 and the spring mounts 76 form the bases upon which the set of washers are compressed in a loading of the suspension.

The spring guide 80 also includes a closely fitting annular bearing 94 disposed about its inner perimeter extending axially between the base retention washer 92 and the shoulder 90, composed of a durable material such as Delrin to facilitate axial displacement of the guide tube 82 relative to the spring guide 80.

The system depicted utilizes two urethane washers which act as springs. It has been found that at least two springs are preferable since a single spring, sized to attain a desired deflection of at least one inch, may tend to buckle, that is, deform unevenly about its circumference upon extreme compression. The system, therefore, employs two or more springs to avoid this particular problem.

The specific durometer of the rubber is also of particular importance in order to effect a predetermined smoothness of ride. Generally, the harder the elastomer, the faster the spring response and consequently, the harder and more jolting the ride. An acceptable level of smoothness has been obtained using a durometer of $65\pm2$ for a 100–200 lb rider. Lighter riders find that a durometer of $60\pm2$ provides an acceptable ride and heavier riders find a durometer of $70\pm2$ to be necessary.

Ride smoothness, as well as system response, is additionally affected by the amount of pre stressing that is applied to the system. The urethane springs 78 in this example, are generally loaded with approximately 15% displacement from their normal resting state by placing the rebound and stop washers 86, 88 in compressive engagement with the spring guide shoulder 90. In particular, the guide tube 82 is sized so that when the bolt 84 is tightened into the spring mount 76, 15% linear displacement occurs. As a result of pre-stressing, the spring assembly maintains a "loaded state". Therefore, the suspension experiences no undue stretching in an unloaded state, such when the bicycle rear wheel 12 leaves the ground in a jump. The advantage of this arrangement is, thus, that the rear wheel 12 does not generally drag upon the ground with minimal traction while the bicycle is air borne. Rather, the wheel 12 tends to contact the ground only with sufficient force to ensure proper traction. In other words, the wheel rarely "dangles" from its suspension. Additionally, pre-stressing tends to add a certain degree of predictable firmness to the ride since any initial slack is removed from the spring system 48.

Figure 8:
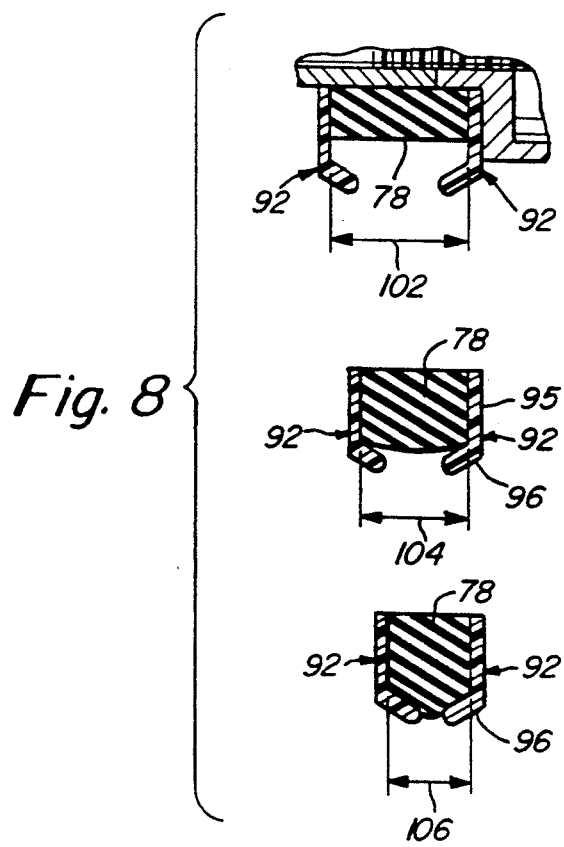
FIG. 8 is a schematic illustration of a spring according to the invention under various degrees of compression.
Figure 9:
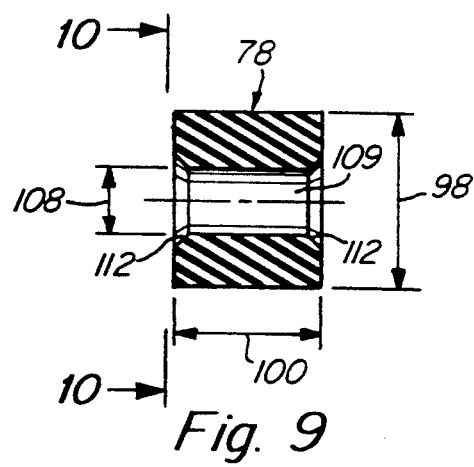
FIG. 9 is a cross sectional view of a spring of FIG. 7.
Figure 10:
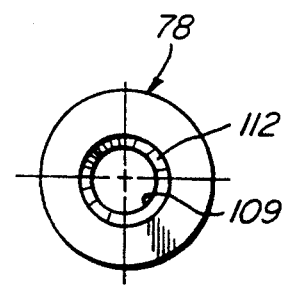
FIG. 10 is a front view of the spring of FIG. 9 along line 10—10.

The retention washers 92 particularly serve to prevent overcompression of the urethane springs 78. FIG. 8 depicts the springs at uncompressed, one half compressed and approximately fully compressed states. The springs 78 in this example (See FIGS. 9 and 10) have an uncompressed diameter 98 of 26 millimeters and a length 100 of 22 millimeters. In approximately one half compression, the spring length decreases from the pre-stressed length 102 of approximately 19.5 millimeters to a length 104 of 14.5 millimeters. The spring absorbs this compression by extending radially from the prestressed diameter of approximately 27 millimeters outwardly to touch the joint of the tapered rim 96 and base 95 of the retention washers 92 (See FIGS. 11 and 12) which is at a diameter of approximately 32.5 millimeters. In approximately full compression, the springs attain a length 106 of approximately 11 millimeters with the retention washer rims being spaced only about 3 millimeters apart. The spring in this configuration expands radially to approximately the edge retention washer rim 96 at a diameter of approximately 42 millimeters (See FIGS. 11 and 12). Thus, the diameter of the prestressed springs 78 increases by approximately 1.6 times in full compression.

The retention washer rim 96 is tapered at an angle $\theta$ from the base 95 (FIG. 13) which enables progressive engagement of the outer edge of the urethane springs 78, effectively limiting their radial expansion beyond a predetermined additional radial distance at full compression. The tapered rims 96 of the urethane springs provide resistance to further radial expansion causing an extremely high axially directed resistive pressure that counters further compression. The pressure, as full compression is reached, increases exponentially. Since the spring material is elastomeric, however, the axial pressure may still be overcome to a small extent, thus helping to prevent a violent jolting effect when "bottoming out" the suspension.

Smoothness of ride is further enhanced, and jolts are minimized through the damping effect of the urethane springs 78. Since the springs 78 are elastomeric, they may be formed with an inner hole 109 having diameter 108 (Figs. 9 and 10) of 10.2 millimeters in this example which is somewhat less than the outer diameter 110 (FIG. 7) of 13 millimeters for the guide tube 82. Thus, the springs are in an interfering fit with the guide tube.

During assembly, the springs 78 are force fitted over the guide tube 82. This is facilitated by the 45 degree taper 112 (FIGS. 9 and 10) about each inner hole 109. The difference in diameters generates a hoop stress in the springs. This hoop stress causes significant friction between the surface of washers relative to the guide tube surface during displacement resulting from spring compression and expansion. This friction absorbs some of the energy generated by the suspension system and also serves to slow the spring response. Therefore, the friction generated between the washers 78 and the guide tube 82 damps the system. This friction damping, along with the inherent energy absorbing characteristics of the springs, provides a significantly smoother ride with reduced jointing over rough terrain. Note that hoop stress also serves to prevent buckling of the springs as described above.

Having described one embodiment of the present invention, it should now be apparent to those skilled in the art that numerous other improvements, modifications and embodiments are contemplated as falling within the spirit and scope of the present invention. Therefore, this description is to be taken only by way of example and not in any way to limit the scope of this invention.

I claim:

1. A bicycle frame comprising:
a main frame, the main frame including a seat tube and a down tube interconnected to form a main frame junction;
a crank assembly attached to the main frame and having at least two sprockets, the sprockets including a smaller diameter sprocket and a larger diameter sprocket,
a pivotable rear-wheel suspension system having a chain stay and a seat stay, each stay having a jointed and a free end, the jointed ends interconnected to form a joint, and the free ends interconnected with the main frame, the free end of the chain stay pivotably attached to the main frame at a location above the main frame junction and above and close to the larger diameter sprocket of the crank assembly, and
a bridge tube interconnecting the seat tube and the down tube, and wherein the chain stay is pivotably attached to the bridge tube.

2. A bicycle frame comprising:
a main frame, the main frame including a seat tube and a down tube interconnected to form a main frame junction;
a crank assembly attached to the main frame and having at least two sprockets, the sprockets including a smaller diameter sprocket and a large diameter sprocket,
a derailleur attached to the seat tube for shifting a chain between the sprockets,
a pivotable rear-wheel suspension system having a chain stay and a seat stay, each stay having a jointed and a free end, the jointed ends being interconnected to form a joint, and the free ends interconnected with the main frame, the free end of the chain stay pivotally attached to the main frame at a location above the main frame junction and above and close to the larger diameter sprocket of the crank assembly, wherein the free end of the chain stay is configured in the shape of an arc, the arc defining a path that extends over the derailleur and the chain, whereby clearance for the chain and derailleur is provided by the chain stay.

3. A bicycle frame as claimed in claim 1, wherein the free end of the chain stay is configured in the shape of an arc.

4. A bicycle frame as claimed in claim 1 or 2, wherein the free end of the seat stay is attached to the main frame via a linear shock absorber, and wherein the linear shock absorber displaces along an axis aligned tangentially with a circle having its center at the pivot.

5. A bicycle frame as claimed in claim 1 or 2, wherein the joint is attached to a rear wheel at an axle bracket, wherein the chain stay and seat stay are interconnected only proximate to the axle bracket and are unconnected to one another along their lengths extending from the joint to provide a unitary, resilient fork capable of flexure, and wherein the free end of the seat stay is attached to the main frame via a linear shock absorber, which displaces along an axis aligned tangentially with a circle having its center at the pivot.

6. A bicycle frame as claimed in claim 5, wherein the linear shock absorber comprises at least two elastomeric elements in axially alignment and separated by a rigid element positioned therebetween.

7. A bicycle frame as claimed in claim 5, wherein the linear shock absorber comprises an elastomeric element and means for progressively limiting the spring rate of the elastomeric element.

8. A bicycle frame as claimed in claim 1 or 2, wherein the free end of the seat stay is attached to the main frame via a shock absorber, and wherein the shock absorber comprises at least two elastomeric elements in axial alignment and separated from one another by a rigid element.

9. A bicycle frame as claimed in claim 1 or 2, wherein the free end of the seat stay is attached to the main frame via a shock absorber, and wherein the shock absorber comprises an elastomeric element and means for limiting the radical expansion of the elastomeric element.

10. A bicycle frame as claimed in claim 8, wherein the seat stay is nonpivotably attached to the linear shock absorber.

11. A bicycle frame as claimed in claim 9, wherein the seat stay is nonpivotably attached to the linear shock absorber.

12. A bicycle frame as claimed in claim 1 or 2 further comprising a shock absorber attached to the free end of the seat stay, the shock absorber including at least two elastomeric elements in axial alignment and separated by a rigid element positioned therebetween, each of the elastomeric elements having a centrally disposed opening, the elastomeric elements being slidably positioned on an axially aligned rod passing through each centrally disposed opening; and means for limiting radial expansion of the elastomeric elements as the elastomeric elements are compressed in an axial direction by suspension loading, the means for limiting radial expansion constructed and arranged so that a first distance of axial compression generates a first discrete level of axial resistance force and a second distance of axial compression, beyond the first distance, generates a higher second discrete level of axial resistance force.

13. A bicycle frame as claimed in claim 1 wherein the larger diameter sprocket comprises a largest diameter sprocket.

14. A bicycle frame as claimed in claim 2 wherein the larger diameter sprocket comprises a largest diameter sprocket.

15. A bicycle frame as claimed in claim 12, wherein the elastomeric elements and rod have an interferring fit whereby a frictional force resisting movement of the elastomeric elements on the rod is generated.

16. A bicycle frame as claimed in claim 12, further comprising means for generating a frictional resistance to axial movement by the elastomeric elements.

17. A bicycle frame as claimed in claim 12, wherein the shock absorber is constructed and arranged such that the elastomeric elements combined are capable of axial compression of between ½ inch and 1½ inches under normal usage loading.

18. A bicycle frame as claimed in claim 12, wherein the means for limiting radial expansion comprises pairs of retention washers sandwiching the elastomeric elements, wherein each pair of retention washers includes a pair of facing perimeter walls extending toward one another and wherein an outermost circumferential edge of each of the elastomeric elements is positioned radially inwardly from the perimeter walls in a spaced apart relationship from the perimeter walls in an initial unloaded resting state, whereby the outermost radial edges radially expand free of contact with the perimeter walls during the first discrete level of axial resistance force.

19. A bicycle frame as claimed in claim 18, wherein the facing perimeter walls are frustoconically shaped.

20. A bicycle frame comprising:
a main frame, and
a pivotable rear wheel suspension system having a chain stay and a seat stay, each stay having a jointed end and a free end, the jointed ends interconnected to form a nonpivoted joint, and the free ends interconnected with the main frame, the free end of the chain stay pivotably attached to the main frame, and the free end of the seat stay attached to the main frame via a linear shock absorber, the shock absorber having a central rod nonpivotably attached to the main frame, wherein the linear shock absorber displaces on the rod along an axis aligned tangentially with a circle having its center at the pivot, the free end of the seat stay being nonpivotally and nonslidably attached to a spring guide and the spring guide being in engagement with the shock absorber and the spring guide being closely fitted to the rod for translation along the rod and free of transverse movement with respect to the rod.

21. A bicycle frame as claimed in claim 20, wherein the linear shock absorber comprises at least two elastomeric elements in axial alignment and separated by a rigid element positioned therebetween.

22. A bicycle frame as claimed in claim 21, further comprising an axle bracket having a rear wheel attached thereto wherein the nonpivoted joint is attached to the axle bracket, and wherein the chain stay and seat stay are interconnected only proximate to the axle bracket and are unconnected to one another along their lengths extending from the nonpivoted joint to provide a unitary, resilient fork capable of flexure.

23. A bicycle frame as claimed in claim 20, wherein the linear shock absorber comprises an elastomeric element and means for progressively limiting the spring rate of the elastomeric element.

24. A bicycle frame as claimed in claim 20, further comprising means for limiting radial expansion of the elastomeric elements.

25. A bicycle frame as claimed in claim 20, wherein the nonpivoted joint is attached to a rear wheel at an axle bracket, and wherein the seat stay and chain stay are interconnected only proximate to the axle bracket and are unconnected to one another along their lengths extending from the nonpivoted joint to provide a unitary resilient fork capable of flexure.

26. A bicycle frame comprising:
a main frame, the main frame including a seat tube and a down tube interconnected to form a main frame junction;
a crank assembly attached to the main frame and having at least two sprockets, the sprockets including a smaller diameter sprocket and a larger diameter sprocket, a pivotable rear-wheel suspension system having a chain stay and a seat stay, each stay having a jointed and a free end, the jointed ends interconnected to form a joint, and the free ends interconnected with the main frame at a location above the main frame junction and above and close to the larger diameter sprocket on the crank assembly, and a pivot attachment member that extends forwardly of the seat tube toward the down tube, wherein the chain stay is pivotably attached to the pivot attachment member.

27. A bicycle frame as claimed in claim 26 wherein the larger diameter sprocket comprises a largest diameter sprocket.

28. A bicycle frame comprising:

a main frame, the main frame including a seat tube and a down tube interconnected to form a main frame junction;

a crank assembly attached to the main frame and having at least two sprockets, the sprockets including a smaller diameter sprocket and a large diameter sprocket, a pivotable rear-wheel suspension system having a chain stay and a seat stay, each stay having a jointed and a free end, the jointed ends interconnected to form a joint, and the free ends interconnected with the main frame at a location above the main frame junction and above and close to the larger diameter sprocket on the crank assembly, and a pivot attachment member extending rearwardly from the down tube toward the seat tube, wherein the chain stay is pivotably attached to the pivot attachment member.

29. A bicycle frame as claimed in claim 28 wherein the larger diameter sprocket comprises a largest diameter sprocket.

* * * * *